(12) United States Patent
North et al.

(10) Patent No.: US 7,768,144 B2
(45) Date of Patent: Aug. 3, 2010

(54) UNDERWATER WAVE/ENERGY TRANSDUCER

(76) Inventors: Vaughn W North, 7431 Lost Canyon Cir., Salt Lake City, UT (US) 84121; Stephen C. Jacobsen, 274 S. 1200 East, Salt Lake City, UT (US) 84102; Fraser M. Smith, 2458 Promontory Dr., Salt Lake City, UT (US) 84109

( * ) Notice: Subject to any disclaimer, the term of this patent is extended or adjusted under 35 U.S.C. 154(b) by 353 days.

(21) Appl. No.: 11/903,530

(22) Filed: Sep. 20, 2007

(65) Prior Publication Data
US 2008/0106101 A1 May 8, 2008

Related U.S. Application Data

(63) Continuation-in-part of application No. 10/541,333, filed as application No. PCT/US03/41730 on Dec. 31, 2003, now abandoned.

(60) Provisional application No. 60/437,555, filed on Dec. 31, 2002.

(51) Int. Cl.
F03B 13/10 (2006.01)
F03B 13/12 (2006.01)
H02P 9/04 (2006.01)

(52) U.S. Cl. ........................... 290/53; 290/42
(58) Field of Classification Search ........... 290/42, 290/53
See application file for complete search history.

(56) References Cited

U.S. PATENT DOCUMENTS

| 3,895,236 A * | 7/1975 | Herron .................... 290/55 |
| 4,002,416 A * | 1/1977 | Axford ..................... 417/330 |
| 4,077,213 A * | 3/1978 | Hagen ...................... 60/500 |
| 4,145,882 A | 3/1979 | Thorsheim ................ 60/325 |
| 4,170,738 A * | 10/1979 | Smith ...................... 290/42 |
| 4,258,269 A | 3/1981 | Tsubota .................... 290/53 |
| 4,288,985 A | 9/1981 | Dyck ........................ 60/398 |
| 4,313,059 A | 1/1982 | Howard ..................... 290/54 |
| 4,371,788 A * | 2/1983 | Smith, Jr. ................. 290/42 |
| 4,404,490 A | 9/1983 | Taylor ...................... 310/339 |
| 4,555,307 A * | 11/1985 | Hagen ...................... 202/177 |
| 4,614,875 A | 9/1986 | McGee ..................... 290/1 R |
| 4,685,296 A | 8/1987 | Burns ....................... 60/497 |
| 4,741,157 A | 5/1988 | Nishikawa ................. 60/398 |
| 4,748,808 A | 6/1988 | Hill ........................... 60/398 |
| 4,781,023 A | 11/1988 | Gordon ..................... 60/506 |
| 4,850,190 A | 7/1989 | Pitts .......................... 60/398 |
| 5,105,094 A | 4/1992 | Parker ....................... 290/53 |

(Continued)

FOREIGN PATENT DOCUMENTS

GB 2282188 3/1995

(Continued)

*Primary Examiner*—T C Patel
*Assistant Examiner*—Pedro J Cuevas
(74) *Attorney, Agent, or Firm*—Thorpe North & Western LLP

(57) ABSTRACT

A method for generating electrical current indirectly from ocean wave action based on the reciprocating surge of the ocean that directly results from the overhead wave action. The method includes (a) positioning an energy transducer below overhead wave action and at a depth and orientation substantially responsive to reciprocating water surges arising from the overhead wave action; and (b) powering the energy transducer by the surges in alternating first and second directions to generate electrical current.

17 Claims, 6 Drawing Sheets

U.S. PATENT DOCUMENTS

| | | | |
|---|---|---|---|
| 5,347,186 A | 9/1994 | Konotchick | 310/17 |
| 5,355,674 A | 10/1994 | Rosenberg | 60/325 |
| 5,438,553 A | 8/1995 | Wilson | 367/140 |
| 5,500,635 A | 3/1996 | Mott | 340/323 R |
| 5,548,177 A | 8/1996 | Carroll | 310/339 |
| 5,552,656 A | 9/1996 | Taylor | 310/337 |
| 5,552,657 A | 9/1996 | Epstein et al. | 310/339 |
| 5,578,889 A | 11/1996 | Epstein | 310/339 |
| 5,844,323 A | 12/1998 | Hung | 290/54 |
| 5,955,790 A | 9/1999 | North | 290/53 |
| 6,091,159 A | 7/2000 | Galich | 290/1 R |
| 6,109,029 A | 8/2000 | Vowles et al. | 60/398 |
| 6,184,590 B1* | 2/2001 | Lopez | 290/53 |
| 6,229,225 B1* | 5/2001 | Carroll | 290/53 |
| 6,291,904 B1 | 9/2001 | Carroll | 290/53 |
| 6,644,027 B1* | 11/2003 | Kelly | 60/498 |
| 6,700,217 B1 | 3/2004 | North et al. | 290/53 |
| 6,731,019 B2* | 5/2004 | Burns et al. | 290/42 |
| 6,791,205 B2* | 9/2004 | Woodbridge | 290/53 |
| 6,864,592 B1* | 3/2005 | Kelly | 290/42 |
| 7,023,104 B2* | 4/2006 | Kobashikawa et al. | 290/42 |
| 7,042,112 B2* | 5/2006 | Wood | 290/53 |
| 7,131,269 B2* | 11/2006 | Koivusaari | 60/495 |
| 7,164,212 B2* | 1/2007 | Leijon et al. | 290/42 |
| 7,554,215 B1* | 6/2009 | Caragine | 290/42 |
| 2002/0047273 A1* | 4/2002 | Burns et al. | 290/53 |
| 2003/0001392 A1* | 1/2003 | Gerber et al. | 290/42 |
| 2003/0193197 A1* | 10/2003 | Hibbs et al. | 290/53 |
| 2004/0007881 A1* | 1/2004 | Kobashikawa et al. | 290/53 |
| 2004/0061338 A1* | 4/2004 | Woodbridge | 290/53 |
| 2004/0251692 A1* | 12/2004 | Leijon et al. | 290/42 |
| 2008/0084121 A1* | 4/2008 | Kelly | 310/12 |
| 2009/0196693 A1* | 8/2009 | Kelly et al. | 405/195.1 |
| 2010/0038913 A1* | 2/2010 | Svelund | 290/53 |

FOREIGN PATENT DOCUMENTS

JP          10103215      4/1998

* cited by examiner

UNDERWATER WAVE/ENERGY TRANSDUCER

This application is a continuation-in-part of application Ser. No. 10/541,333 which was filed on Apr. 18, 2006, which is a 371 of PCT/US03/41730 filed Dec. 31, 2003 which claims benefit of application 60/437,555 filed Dec. 31, 2002.

BACKGROUND OF THE INVENTION

1. Field of the Invention

This invention relates to devices for converting ocean wave action to electrical current as a useful energy source. More specifically, the invention pertains to underwater devices which are positioned at the ocean floor and respond to changes in wave height to supply variable pressures or water movement at the transducer.

2. Related Art

The abundance of energy contained in ocean waves has long been recognized. It has been estimated that over 20,000 km of coastline throughout the world may be suitable for harnessing wave power for conversion to electrical power by means of some type of power transducer. In systems close to the shore, the estimated average energy available is approximately 40 to 70 kW per meter of shoreline in energy rich coastal areas, and approximately 10 to 20 kW/m in areas of lesser wave activity. This extensive power resource has been acknowledged by a number of countries, as well as several private industries. Several large power installations have been constructed in an effort to capitalize on this renewable energy source.

Despite much effort and some recent progress, extracting this energy in a practical, cost effective system remains a formidable challenge. The difficulty of energy conversion within the ocean environment arises from the rather hostile conditions that must be overcome. For example, the saltwater conditions are chemically aggressive and contain marine life that result in biofouling of the operating system, further adding to the dynamic state of unpredictable change. In addition to salt water, sand and marine life, weather conditions can generate extreme conditions, particularly at ocean surfaces and shoreline. Storm activity and winds have destroyed countless devices that have endeavored to extract energy from wave movements at the ocean surface, requiring high costs of maintenance and replacement that have labeled wave energy technology as generally uneconomical.

U.S. Pat. No. 6,700,217 leading to the present invention disclosed a variety of devices that are positioned on the ocean floor, preferably at depths between 5 and 30 meters, significantly reducing exposure to adverse weather and wind conditions. As waves move above the device, the water level changes, causing a pressure differential to be variably applied to the transducer. These pressure changes register at the transducer and are converted by electro-mechanical devices into electricity. Several of the disclosed devices include coil/magnet combinations as the operative component for changing mechanical movement into electrical current. This current is transmitted to a shore location for storage in a battery pack or other location for use.

SUMMARY OF THE INVENTION

The present invention provides a method for generating electrical current indirectly from ocean wave action based on the reciprocating surge of the ocean that directly results from the overhead wave action comprising the steps of:

a) positioning an energy transducer below overhead wave action and at a depth and orientation substantially responsive to reciprocating water surges arising from the overhead wave action; and b) powering the energy transducer by the surges in alternating first and second directions to generate electrical current.

An additional embodiment includes an energy transducer device for positioning at the ocean floor for converting water movement along a shoreline in the ocean to electrical current, including (i) a mounting base configured for positioning at the ocean floor at a location of possible water movement along a flow path in a substantial horizontal orientation near the ocean floor;

(ii) an electro-mechanical transducer coupled to the mounting base and configured for positioning within the flow path and responsive to the water movement along the flow path to generate electrical current; and (iii) a variable resistance element coupled to the transducer and including a sensor responsive to changes in force applied by the surges to reduce resistance to movement by the transducer with relatively lower force.

Numerous other embodiments are disclosed herein, more generally illustrating the scope of the invention. Other configurations will also be apparent to those skilled in the art, based on the following detailed description and accompanying drawings.

DESCRIPTION OF EMBODIMENTS

The present application primarily illustrates embodiments of the invention applied in a substantially horizontal orientation above the ocean floor. It will be apparent to those skilled in the art that the actual orientation of the transducer can vary in any manner that responds to a reciprocal surge of water responsive to the pressure differential that exists near the ocean floor as a consequence of the wave action occurring at the surface. Accordingly, the invention is not intended to be limited by reference to only horizontal positioning, but in fact may be at other orientations that operate within the inventive principles disclosed.

Figure 1:
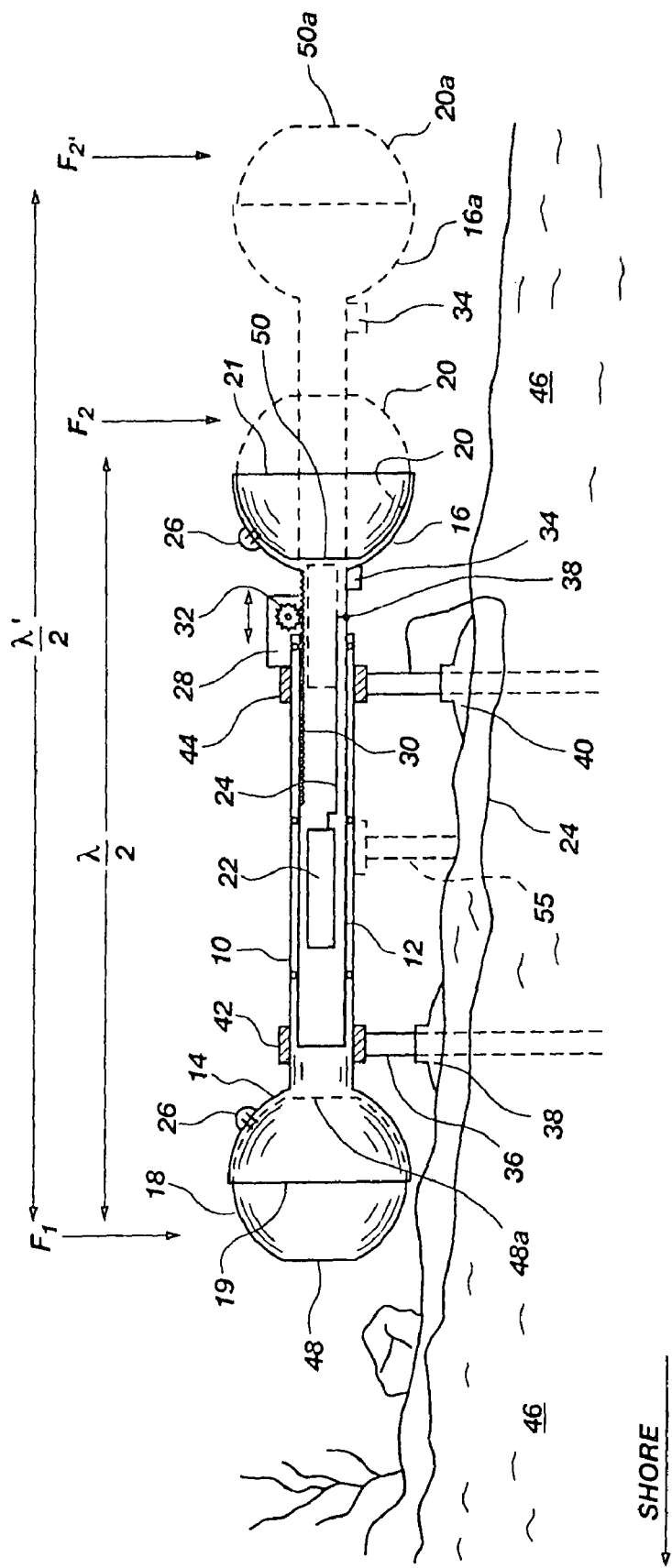
FIG. 1 shows a side view of a preferred embodiment of the invention.

Referring to FIG. 1, an example of the present invention is illustrated with an elongate tube 10 that provides a flow path for the water. In order to accommodate variable wavelengths of ocean waves, a telescopic configuration is provided with a second tube 12 housed within the first tube 10. It will be apparent that a single tube construction could be applied where variable wavelengths are not a significant factor. The tube length corresponds to approximately one-half wave length of the ocean wave activity, thereby positioning one tube end at a wave trough and an opposing end below a wave crest. A resulting displacement or surge of water is generated along the ocean floor corresponding to the pressure differential arising from the difference in wave height. This surge is used to power the transducer in a reciprocating manner as the crests and troughs alternate at opposing ends of the tube.

In the illustrated embodiment, a conventional electro-mechanical device 22 such as a turbine is positioned at an intermediate location. Tube diameters are selected to provide a narrow flow channel to enhance flow speed through the electro-mechanical device 22 positioned within the flow path. To traverse the tube length, the water must pass through the electro-mechanical device, turning the internal fins of a generator, dynamo or other transducer accordingly. Such operative principles are well known and need not receive further explanation.

FIG. 1 also illustrates the feasibility of both open and closed systems in the underwater environment. If the tube is an open-ended configuration, water will flow directly into the tube in a reciprocating manner, in open communication with the surrounding ocean environment. Screens may be applied at the respective openings to prevent larger aquatic life from entering the tube and interfering with the operation of the electro-mechanical device. Alternatively, the ends can be sealed with a diaphragm as described hereafter, to prevent any foreign matter from migrating into the operating volume of the tube.

In order to increase flow rate within the tube and thus increase current output, relatively large volumes of contained water are captured at the opposing ends 14 and 16 of V the sealed version. These volumes are contained within opposing collapsible spheres, formed at the tube connection with rigid hemispheres 14 and 16, respectively coupled to flexible hemispherical diaphragms 18 and 20. These respective diaphragms are sealed at the outer perimeters 19 and 21 of the tube ends 14 and 16 to fully contain the working fluid therein. Water is introduced within the device through a valve mechanism 26 on one or both ends of the tube body.

The volume of water within the device will be a function of wave height and tube length. For example, greater wave height will allow increased force to displace more water from one tube end to the other. Therefore, maximum output would be accomplished with water volume approximately equal to the extended length of the telescopic tubes 10 and 12, plus the volume of one sphere. This configuration is illustrated in FIG. 1, in which the water has been fully displaced to the left, filling the spherical structure of terminal end 14 and flexible diaphragm 18. The opposing diaphragm 20 has been fully displaced into the cavity of terminal end 16. This corresponds to the alignment of a trough above the right end 16 of the tube with force F2 bearing on the diaphragm 20, and a wave crest oriented above the left end 14, with the diaphragm 18 fully extended.

As this wave moves along the length of the device toward shore, the water height gradually shifts, causing the water to reverse direction of flow and filling the opposing end 20 as illustrated in phantom line. The successive alternate disposition of the troughs and crests over the opposing ends of the tube establish a pumping action that continuously drives the electro-mechanical device for DC current output. This current passes along a conductor 24 to a battery pack or operating load (not shown).

In view of the changing wavelength associated with wave action, a servo system is provided to position the telescopic tube 12 at a relative location to tube 10 such that the total length of the flow path is approximately one-half wavelength. This system comprises a drive motor 28 coupled to the outer tube 10 as shown. A drive gear 32 engages a track 30 on the telescopic tube 12. Pressure sensors can be attached to the respective ends of the tube to provide a servo feed back capable of registering the proper extension of the telescopic tube 12 to reach a half wavelength. In view of the increased vulnerability to turbulence in the extended position, a vibration sensor 34 is coupled to the extended tube end to activate retraction of the extended tube if water turbulence poses a risk to the system. This extended configuration is identified in phantom line with components 16a and 20a. If wave action or adverse currents threatened the system, the driver 28 would automatically be activated to retract the tube 12 within the outer tube 10.

To further provide security and stability to the device, anchor mounts 36 and 38 are provided. These are respectively driven into the ocean floor at a separation distance equal to the length of the outer tube 10. Ground stabilizers 38 and 40 are bolted in place at the anchors to reduce migration into the ocean sand or base 46. Mounting clamps 42 and 44 engage opposite ends of the outer tube 10 and secure the tube structure in a fixed position with an orientation aligned with the direction of wave propagation. Other methods for stabilizing the device in a fixed position at the ocean floor will be apparent to those skilled in the art.

As an alternative anchor system to support posts 34 and 36, a single support 55 can be used that includes a rotational control to enable the tube to rotate or shift along a variable direction of wave movement. Accordingly, as wave direction changes, the tube would position itself substantially normal to the wave front, or at some lesser angle than 90 degrees, to optimize energy conversion.

To protect the respective diaphragm ends 18 and 20 from being damaged by extreme wave conditions, rigid grid plates 48 and 50 are attached at opposing ends of the device. These plates are sized to be slightly larger that the tube opening so that maximum displacement of the diaphragm engages the plate at the high pressure side against the opening of the tube, it against further fluid displacement. This also protects the extended lower pressure side from further displacement that might rupture the seal of the diaphragm to the rim 19 or 21. These blocking plates will allow the device to continue to operate in severe wave conditions without serious damage to the device.

Material construction for this device may utilize environmentally compatible materials known within the industry to have sufficient strength to withstand the rigorous ocean environment. A small microprocessor can be housed within the motor drive unit 28 or within the tube body as part of the electro-mechanical device housing. This microprocessor can provide control for the telescopic displacements for wavelength and directional variations, as well as current rectification, data transmission and self-maintenance. One example of such maintenance could be a periodic full extension and retraction action to clean debris, animal and plant life from the retractable exterior. This may be timed at regular intervals, or may be sensed by irregular resistance to movement of the telescopic tube 12.

Figure 2:
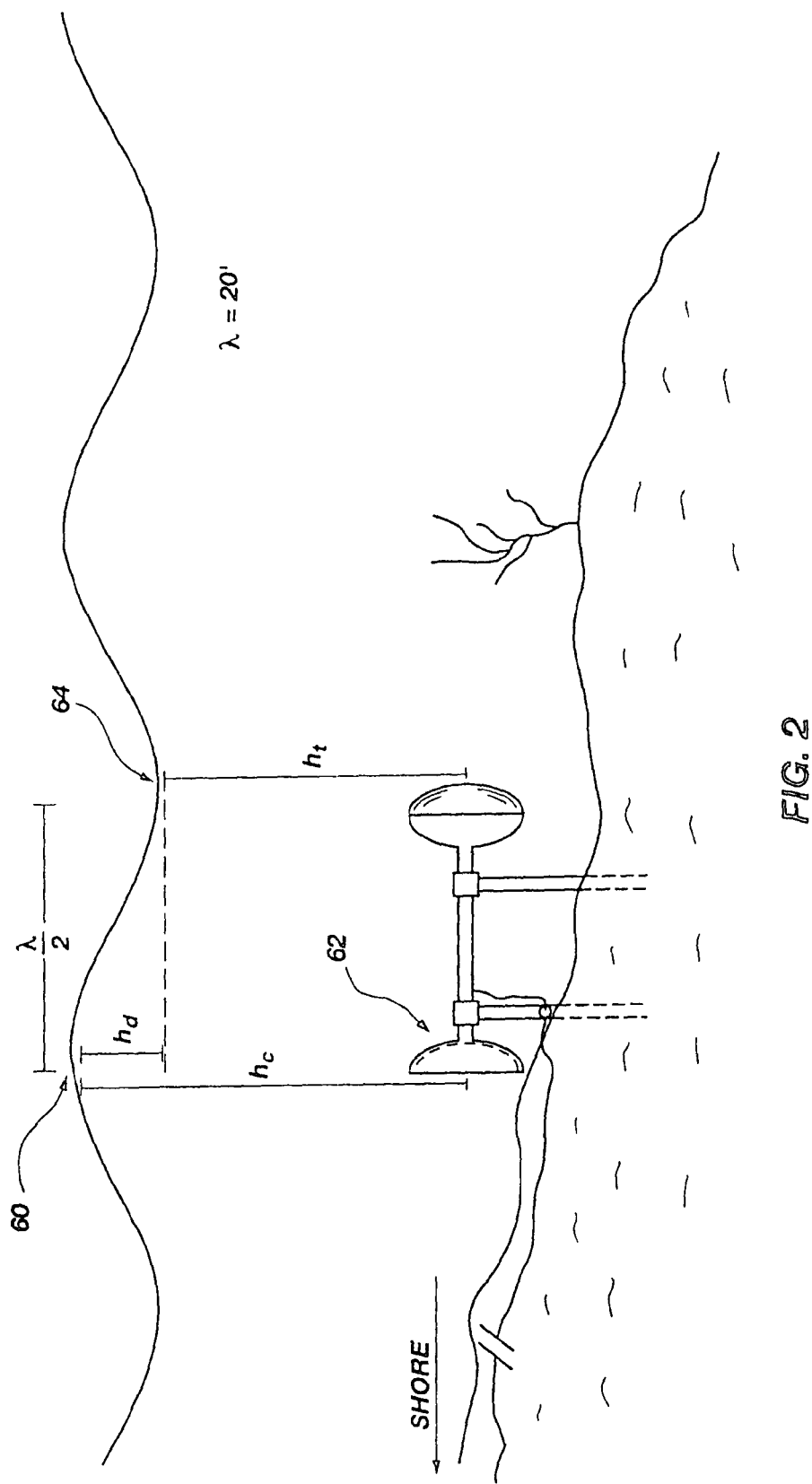
FIG. 2 illustrates an alternative configuration disposed under the respective crest and trough of an ocean wave.
Figure 3:
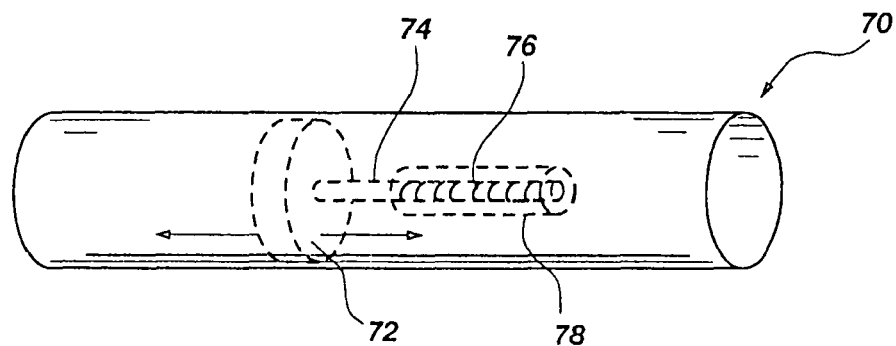
FIG. 3 depicts a side view of an additional embodiment of the invention including a piston element.

FIG. 2 illustrates operation of the device with respect to an overhead wave. The wave crest 60 is momentarily located above the left side of the device 62, with a water height of $_{hc}$ (crest height). The right side of the tube is oriented below the trough side 64 with a water height of $_{ht}$. The difference in height $_{hd}$ provides the working force which extends downward and provides for displacement of the contained water within the tube FIG. 3 show a comparable open tube system 70 having a piston driven device 72 for generating the electrical current. The piston is coupled to a support rod 74 and coil 76 that reciprocate within a magnetic sheath 78 for production of current. The aforementioned devices are representative of closed turbine and piston systems where the transducer is contained within an enclosure. Other configurations will be apparent to those skilled in the art.

Figures 4A, 4B, 4C:
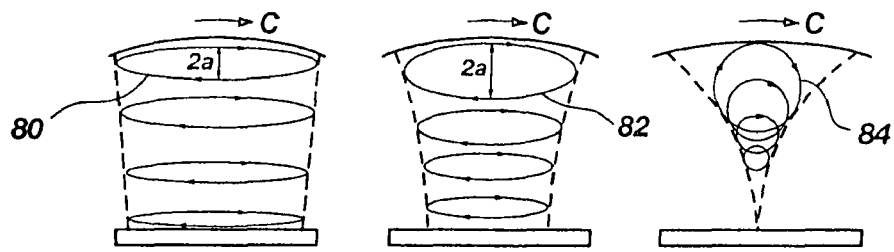
FIG. 4 graphically illustrates reciprocating surge activity within the ocean.

FIGS. 4 *a, b* and *c* depict another dimension of energy distribution within the coastal ocean wave environment, such as might be associated with an Airey wave analysis. FIG. 4*a* shows a cross sectional view of reciprocating displacement of water along a series of flattened recirculating paths 80 at shallow depths under the overhead wave. As the wave crest moves across a volume of water, displacement of the water generates a moderate surge back and forth, a phenomenon that can be seen as sea bed vegetation is pushed too and fro on the ocean floor in response to overhead waves. FIG. 4*b* represents this dynamic response at intermediate depths wherein the reciprocating path is represented by elliptical paths 82 having greater vertical depth. FIG. 4*c* illustrates a more circular path 84 occurring at substantial ocean depths where the wave forces are substantially dispersed and diminished at the depths of the ocean sea-bed. Representative depths for these illustrates might be 5 meters, 15 meters and 100 meters respectively. Based on this comparison, preferred locations for the present invention will be a depth less than 50 meters in order to realize effective surge activity near the ocean floor.

A number of mechanical devices can be positioned at the sea-bed for interaction with this movement or surge of water. Such devices can include open turbines, vertical plates, drag bodies, and other structures that resist movement of the water in order to produce work output. These can be secured in a fixed location with a rotational hinge axis or may be displaceable along a track, as represented in the following examples.

Figure 5:
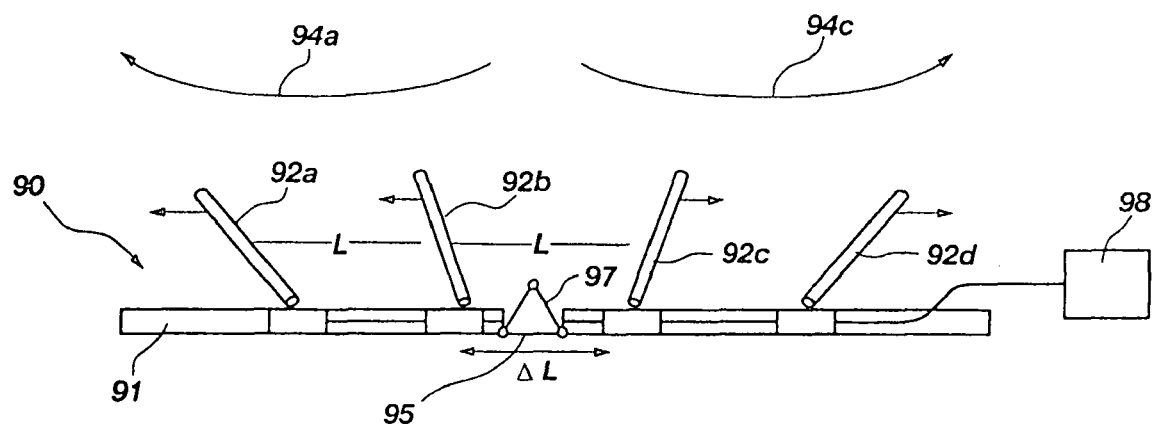
FIG. 5 shows a side plan view of a further embodiment of the invention.

FIG. 5 depicts a transducer device 90 in which the electromechanical device comprises at least one plate 92 displaceable along the flow path 94 in a reciprocating manner. As water reciprocates along the flow path, the water movement urges the plate to reciprocate in like manner. The plate is coupled at a rotational axis to an electro-mechanical power conversion device 96 that translates the displacement of the plate into electric current through appropriate mechanical transmission structure to optimize current production. Each of the outputs of the plates is coupled in series through connecting wires 97 for supplying electrical current to an electrical device or battery pack 98.

Multiple plates can be positioned at separating distances L calculated to provide for cancellation of opposing forces applied to the respective plates. Specifically, plates 92*a* and 92*b* may be positioned to operate in one direction in response to flow path 94*a* while plates 92*c* and 92*d* displace in an opposing direction along flow path 94*c*. In this manner, the net force applied to the base support is at least partially cancelled, greatly diminishing lateral movement forces that would otherwise tend to cause migration of the transducer device 90. Such movement is adverse because it causes the device to settle into the sea-bed or possibly dislodge anchoring pins or structure used to secure the device in place. Determination of correct L values could be processed by a microprocessor powered by the electrical output of the device and operable to control a worm gear 95 or other lateral adjustment mechanism to develop a change ΔL that corrects the separation distance according to overhead wavelengths. Connecting hinge plates 97 operate to maintain alignment of the multiple sections of the device.

Figure 6:
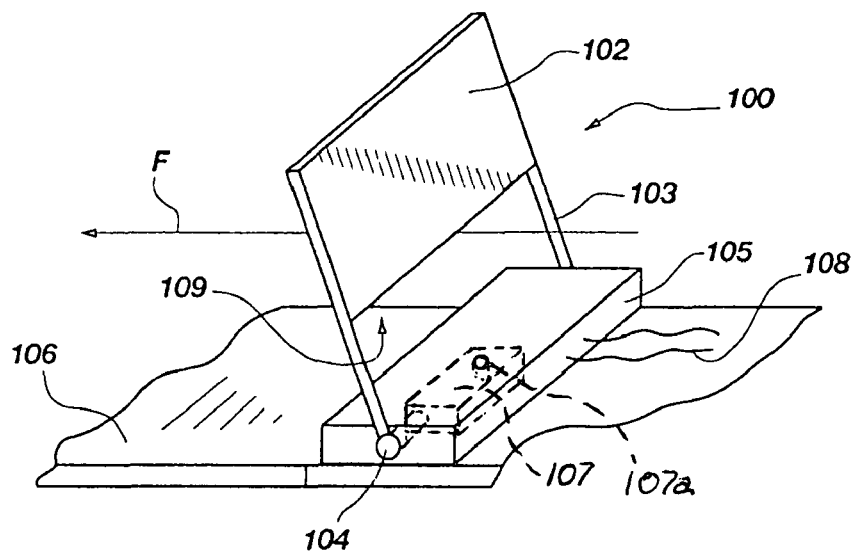
FIG. 6 depicts an elevated perspective view of an isolated displacement plate in accordance with one embodiment of the invention.

FIG. 6 shows a more specific rotational plate configuration 100 including an upper plate member 102 with extending support arms 103. Lower ends of the support arms connect to mechanical couplings 104 that supply rotational movement to an electromechanical transducer 105 supported on the support base 106. Gearing is provided in the transducer 105 to add mechanical leverage to the input energy for optimizing electrical output through leads 108. The elevated plate 102 is positioned above sea-bed level to gain the increased force of water displacement at the higher location. A flow window 109 allows passage of water along the flow path F to sweep debris from the support base, as well as provide stability of the rotational plate within the flow path.

Figure 7:
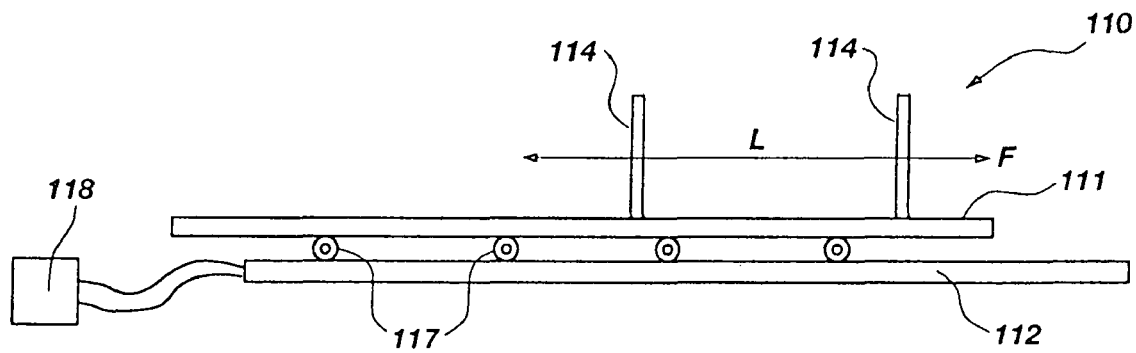
FIG. 7 illustrates a side view of a tracking version of the present invention.

FIG. 7 shows a second embodiment 110 with linear displacement along a track. In this case, a carriage 111 slides or rolls along a track 112 positioning a vertical plate or other resistance body 114 within the flow path 113. The length of the track is determined by the maximum half-wavelength projected for the ocean floor environment. The vertical plate 114 is rigidly fixed to the carriage and provides the resistance against water displacement. As waves pass overhead, reciprocating water surges power the transducer to generate the electrical current by rotating or translating a relative combination of coil and magnet array 117. A load, battery pack or current relay device 118 receives the current for appropriate use. FIG. 7 therefore illustrates a general device wherein that includes a track 112 and tracking member 111 coupled between the track and plate 114 to enable linear displacement of the plate. Here again, a rotational element corresponding to element 55 could be applied to the above described track structures.

Figure 8:
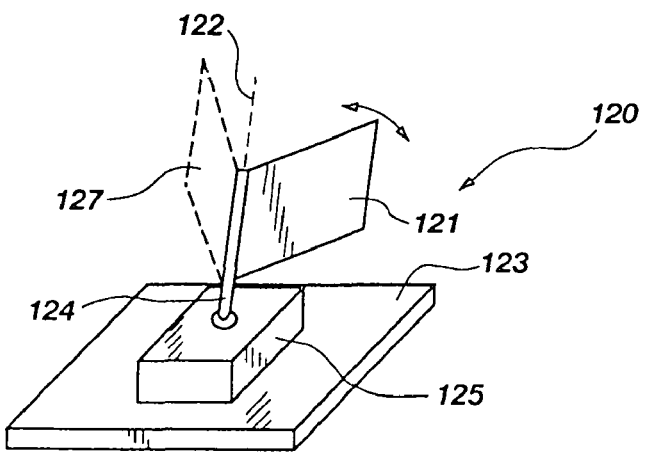
FIG. 8 provides an elevated perspective view of a rotational plate in accordance with one embodiment of the invention.

An alternative plate configuration is shown in FIG. 8, wherein the device 120 includes a plate 121 that is displaceable within the flow path, but in a rotary manner about a rotational axis 122. Specifically, the device includes a base 123 that can be anchored to the ocean floor at an appropriate location and orientation. Extending from the base is a vertical stem 124 that defines the rotational axis 122 that is vertically oriented with respect to the ocean floor. Reciprocating water surges at the ocean floor drive the plate back and forth, rotating a form of motor or electro-mechanical device 125 capable of translating the rotational mechanical energy into electric current. As indicated in phantom line, additional plates 127 could be coupled to the vertical stem.

Figure 9:
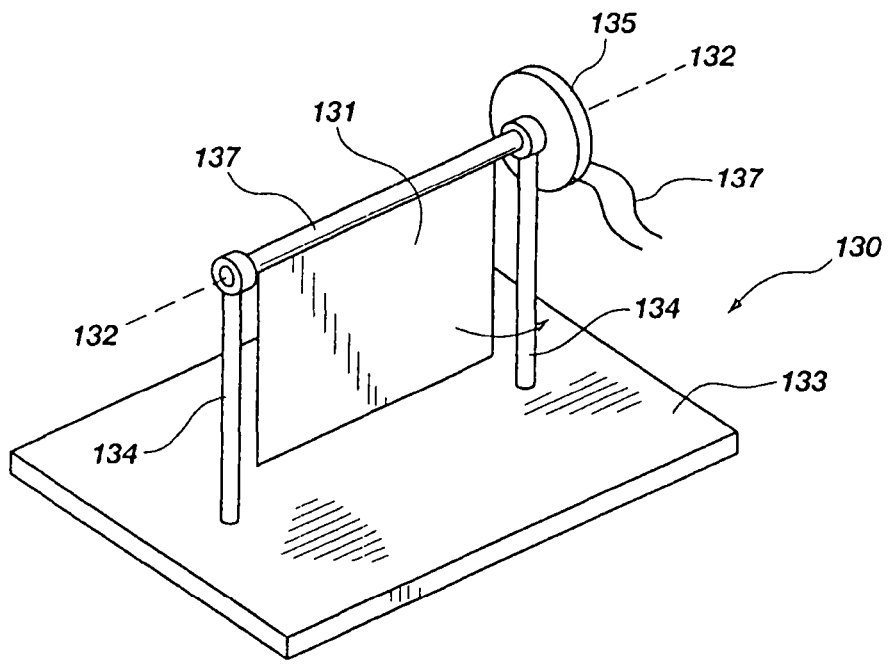
FIG. 9 provides an elevated perspective view of an additional rotational plate in accordance with one embodiment of the invention.

FIG. 9 illustrates a similar device 130 wherein the rotational axis 132 is horizontally oriented about a horizontal axis with respect to the ocean floor. The device 130 includes a plate 131 that is displaceable within the flow path, but in a rotary manner about a rotational axis 132. Specifically, the device includes a base 133 that can be anchored to the ocean floor at an appropriate location and orientation. Extending from the base are vertical support arms 134 that support a horizontal cross arm defining the rotational axis 132 that is horizontally oriented with respect to the ocean floor. Reciprocating water surges at the ocean floor drive the plate back and forth, rotating a form of motor or electro-mechanical device 135 capable of translating the rotational mechanical energy into electric current for delivery along conductors 137.

Figure 10:
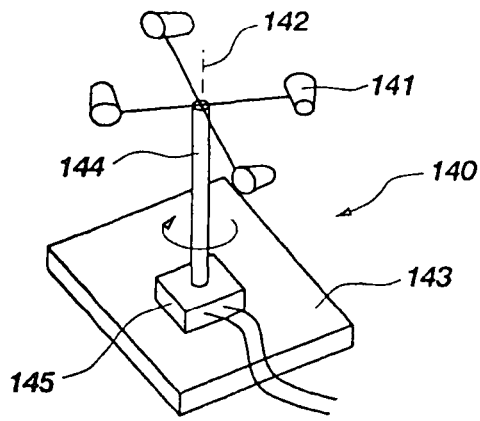
FIG. 10 provides an elevated perspective view of a unidirectional rotational configuration in accordance with one embodiment of the invention.

FIG. 10 illustrates an alternative mechanism for capturing the surge energy of the flow stream by use of an anemometer device such as is used with wind velocity measurement. The device 140 includes a resistance unidirectional element 141 that is displaceable within the flow path, but in a rotary manner about a rotational axis 142'. Specifically, the device includes a base 143 that can be anchored to the ocean floor at an appropriate location and orientation. Extending from the base is a rotational stem 144 that defines the rotational axis 142 that is vertically oriented with respect to the ocean floor. Reciprocating water surges at the ocean floor drive the plate back and forth, rotating a form of motor or electro-mechanical device 145 capable of translating the rotational mechanical energy into electric current. This is discussed in greater detail with respect to FIGS. 13 and 14.

Figure 11:
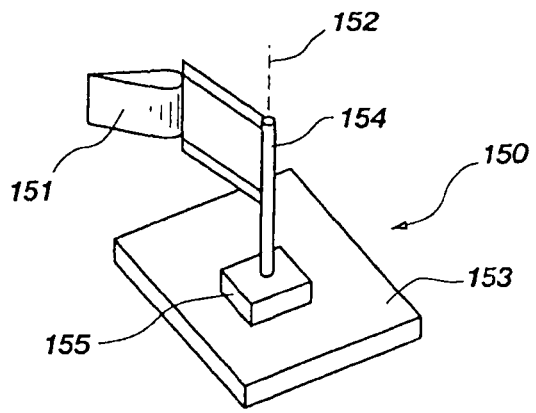
FIG. 11 provides an elevated perspective view of an additional rotational configuration in accordance with one embodiment of the invention.

FIG. 11 illustrates a mechanism for capturing the surge energy of the flow stream by use of a slave fish device. The device 150 includes a resistance foil configuration 151 that is displaceable within the flow path to generate rotary movement about a rotational axis 152. Specifically, the device includes a base 153 that can be anchored to the ocean floor at an appropriate location and orientation. Extending from the base is a rotational stem 154 that defines the rotational axis 152 that is vertically oriented with respect to the ocean floor. Reciprocating water surges at the ocean floor drive the plate back and forth, rotating a form of motor or electro-mechanical device 155 capable of translating the rotational mechanical energy into electric current.

Figure 12:
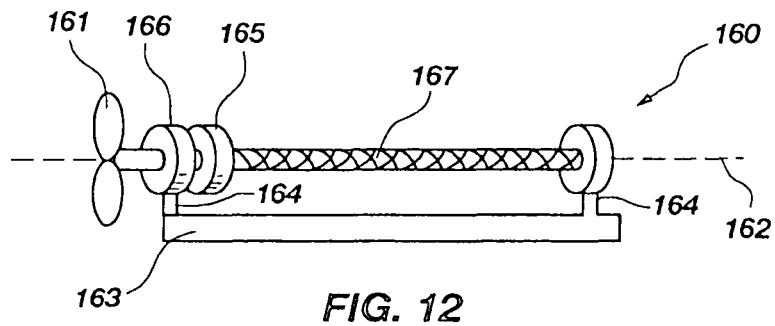
FIG. 12 provides a side perspective view of an additional rotational configuration in accordance with one embodiment of the invention.

FIG. 12 illustrates an alternative mechanism for reinforcing the surge energy of the flow stream by use of an energy storage device. The device 160 includes a resistance element 161 such as a propeller or fin that is displaceable within the flow path, but in a rotary manner about a rotational axis 162. Specifically, the device includes a base 163 that can be anchored to the ocean floor at an appropriate location and orientation. Extending from the base are a pair of horizontal supports 164 upon which is suspended is rotational element 166 that defines the rotational axis 162. Reciprocating water surges at the ocean floor drive the plate back and forth, rotating a form of motor or electro-mechanical device 165 capable of translating the rotational mechanical energy into electric current. Coupled to the rotating motor 165 is an energy storage structure 167 such as an elastic coil having rotational resilience. As the moving water flows in a first direction, the propeller rotates and powers the motor 165. At the same time, the rotation of the energy storage member 167 accumulates potential energy, which can be released following passage of the overhead wave and reversal of the direction of flow. Such a combination of kinetic and potential energy may be useful in environments where the flow direction in one orientation is stronger than that of an opposing direction.

Figure 14:
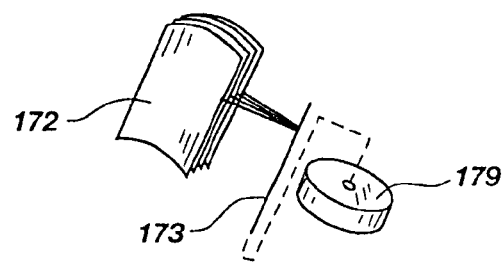
FIG. 14 depicts a folded configuration of the FIG. 13 embodiment.

FIG. 14 shows another version 170 of the anemometer of FIG. 10. In this embodiment, the resistance elements 172 are hinged, concave plates that have a biased open position in which water flow 174 urges the anemometer in its rotational movement 176. Because of the hinge attachment 178 on each plate 172, water flow displaces the plate out of the flow direction from the convex side as shown with plate 172a in a deflected position. Optimal dimensions of the paddles will provide maximum surface exposure to the moving water, while maintaining a total cross-section diameter D that is less than one-half wave length of the passing waves.

Rotational movement is primarily driven by plate 172b that resists the pressure of the water movement 174 because of its open position. The other plates 172 are oriented parallel with the flow direction and assume the biased open position, offering little resistance to the flow until they are rotated into the flow path. In this manner, the anemometer is capable of continuous rotation, providing rotational motion for an attached electro-mechanical conversion device 179. It will be apparent that this embodiment will operate in a reciprocating surge environment such as with overhead ocean waves.

In accordance with this embodiment, the present invention can be described as a method for generating electrical current indirectly from ocean wave action based on the reciprocating surge of the ocean that directly results from the overhead wave action. The method involves a first step of positioning an energy transducer at the ocean floor and at a depth and orientation substantially responsive to reciprocating current surges arising from the overhead wave action. A second step of the invention involves powering the energy transducer by the current surges in alternating first and second directions to generate electrical current. The resulting electrical energy may then be stored in a bank of batteries or other storage device.

This method for converting water movement to electrical current can also be embodied in the steps of (i) positioning an electro-mechanical energy transducer at the ocean floor at a location below overhead wave action resulting in reciprocating water movement along a flow path defined by a reciprocating surge of ocean water occurring in a substantial horizontal orientation near the ocean floor and (ii) coupling the electro-mechanical transducer to voltage storage device for receiving the electrical current; and (iii) operating the transducer in response to the surge activity.

The inventive method can also be adapted to sustained production of electrical current at lower levels by configuring the device with a control module 107 (FIG. 6) for the step of adjusting displacement force from an optimal value required to operate the transducer to a lower resistance upon a reduction of force from the water surge.

For example, the device can be preset for optimal performance based on impedance matching for a desired displacement force to operate a transducer with predefined specifications for optimal performance. This value would typically represent a default setting that would require wave action to generate a surge having sufficient force to optimally displace the transducer. Such a setting might occur with a four foot wave at a transducer depth of twenty feet. If the wave heights for the area are more variable, a sensor and variable resistance element can be coupled to the transducer to adjust the required load force downward and thereby maintain production of current, albeit at a lower, less optimal level.

Such adjustment mechanism could part of a general microcomputer 107a configured with software and a sensor to monitor reciprocal surge activity in the vicinity of the transducer being developed by the overhead wave action. Such a microprocessor could provide operating parameter to the transducer that would optimize impedance matching and current production to the surge environment. Such adjustments would be made based on operating parameters of a given dynamo and drive plate or intrinsical omnidirectional force member.

This method can be practiced with a variety of devices generally including an energy transducer device for positioning at the ocean floor for converting water movement along a shoreline in the ocean to electrical current. Such a device may comprise a mounting base configured for positioning at the ocean floor at a location of possible water movement along a flow path in a substantial horizontal orientation near the ocean floor; and an electro-mechanical transducer coupled to the mounting base and configured for positioning within the flow path and responsive to the water movement along the flow path to generate electrical current. The electro-mechanical transducer may include an anemometer configuration of rotational elements for providing rotational energy in response to the water movement or a drag body attached to a rotatable platform for providing rotational energy to the platform in response to the water movement.

Figure 13:
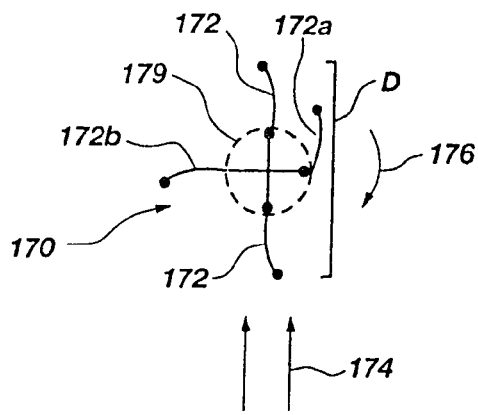
FIG. 13 graphically illustrates a variation of FIG. 10 with a hinged or flexible member to reduce losses.

For example, FIG. 14 illustrates a collapsed configuration of the anemometer of FIG. 13 wherein the respective plates 172 are reoriented to nested configuration, supported by a vertical post 173. This post can be removable from the electro-mechanical generator 179, enabling compact storage prior to deployment in the ocean. This compact size is important for marketing because the device is capable of implacement from a small boat and/or with scuba equipment at near shore locations. Its small size and compactness facilitate transport to the installation site, as well as manipulation by a single person during installation.

An additional omnidirection embodiment 180 is represented in FIG. 15, in which water flow F from any direction will apply its full force against the resistance surface. This offers the advantage of converting greater energy to electrical current because the anemometer version is essentially converting approximately one-fourth the energy of rotation in view of a single paddle 172b being the primary loaded component of the system. Specifically, in this full omnidirectional version, hemispherical dome 182 or other flow resistant body is positioned on a omnidirectional movement base such as a four bar hinged parallelogram 184. The dome 182 is coupled to one hinged corner A of the parallelogram, while one of the remaining corners O is anchored to the ocean floor. As a flow force F is applied, the dome moves to an extreme position downstream of the flow, the four bar structure realigning itself to allow the displacement.

Figure 15A:
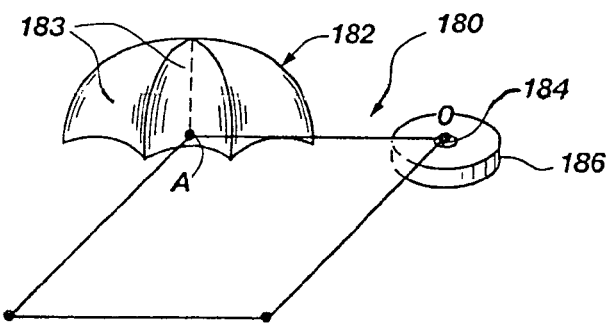
FIGS. 15 a, b, and c show perspective views of a multidirectional movement transducer capable of responding to water displacement from any direction.
Figure 15B:
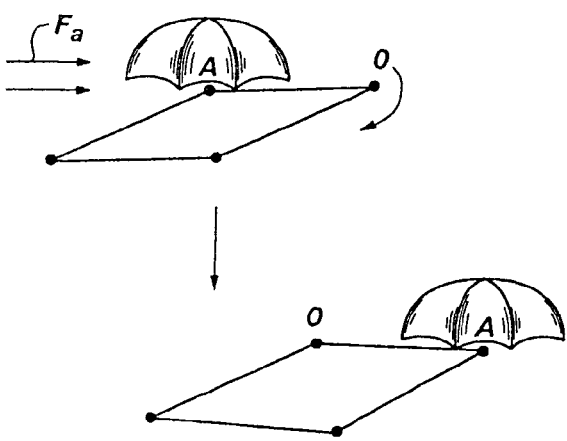

For example, the configuration of FIG. 15a shows the dome at an upper, left-hand side. FIG. 15b illustrates an applied force F coming from the left. This force would correspond to the occurrence of a wave crest above this location, initiating a water surge in direction $F_a$. In response to this force, the dome will shift the parallelgram support to the right as shown in FIG. 15b, causing rotation around the fixed axis at O and generating electrical current into the generator 186. The parallelogram can shift locations because each of the points of attachment on the four corners are hinged as axis points, allowing 360 degree movement of the dome.

Figure 15C:
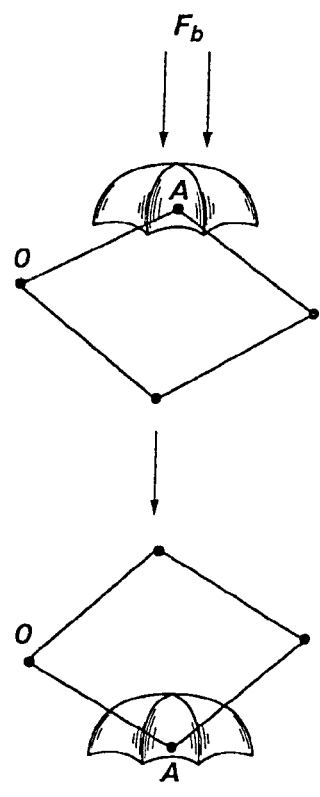

In a typical wave environment, the dome will cycle between the left and right positions in alternating fashion; however, this configuration does allow movement along any of 360 degrees of orientation. For example, FIG. 15c is illustrated with a force $F_b$ coming from the top of the page. This force urges the dome downward to a new extreme position, rotating the fixed axis O and generating current. As indicated above, this configuration is an advantage over the anemometer configuration of FIG. 10 because the full force of the water movement is applied to the resistance element, rather than only to one paddle 172 of the four resistance elements. Obviously, the disadvantage of the dome embodiment is that it can only reciprocate and would not operate in a steady flow current as would the anemometer.

Although a dome version has been illustrated in FIG. 15, it will be apparent that any drag object could be applied, including a cylindrical body. The fluted sides of the drag body facilitate capture of greater force from the water movement. The dome shape allows the water to flow over the device, avoiding buildup of debry around the structure.

It will be appreciated by those skilled in the art, that many variations can be applied within the operative principles of the present invention. In is intended that this disclosure not be considered limiting with respective to such inventive principles, which will be the subject of a future patent application.

We claim:

1. A method for generating electrical current indirectly from ocean wave action based on a reciprocating surge of the ocean along a surge flow path below the wave action that directly results from the overhead wave action, comprising the steps of:
   a) positioning an energy transducer below the overhead wave action and at a depth and orientation substantially responsive to the reciprocating water surges arising from the overhead wave action, said transducer being positioned within a tube enclosure oriented along the flow path; and
   b) powering the energy transducer by the surges in alternating first and second directions to generate electrical current.

2. A method as defined in claim 1, further comprising the step of storing the resulting electrical energy in a bank of batteries or other storage device.

3. A method for generating electrical current from ocean wave action embodied in the steps of:
   (i) positioning an electro-mechanical energy transducer within a tube enclosure positioned at the ocean floor at a location below overhead wave action resulting in reciprocating water movement along a flow path defined by a reciprocating surge of ocean water occurring in a substantial horizontal orientation near the ocean floor;
   (ii) coupling the electro-mechanical transducer to a voltage storage device for receiving the electrical current; and
   (iii) operating the transducer in response to the surge activity to generate electrical current.

4. A method as defined in claim 3, wherein the electro-mechanical device includes rotating impellers operable in response to the water displacement.

5. A method as defined in claim 3 wherein the electro-mechanical device comprises at least one plate displaceable along the flow path in a reciprocating manner.

6. A method as defined in claim 5, further comprising the step of displacing the plate in a linear manner along the flow path.

7. A method as defined in claim 6, comprising the step of positioning the transducer in a track with a tracking member coupled between the track and plate to enable linear displacement of the plate.

8. A method as defined in claim 5, comprising the step of displacing the plate in a rotary manner about a rotational axis.

9. A method as defined in claim 2, further comprising the step of controlling operations of the transducer with a microprocessor to optimize impedance matching and current production to the surge environment.

10. A method as defined in claim 2, further comprising the step of adjusting displacement force from an optimal value required to operate the transducer to a lower resistance upon a reduction of force from the water surge.

11. An energy transducer device for positioning at the ocean floor for converting water movement along a shoreline in the ocean to electrical current, the device comprising:
- a mounting base configured for positioning at the ocean floor at a location of possible water movement along a flow path in a substantial horizontal orientation near the ocean floor;
- a tube enclosure attached to the mounting base and including an electro-mechanical transducer coupled within the tube enclosure within the flow path and responsive to the water movement along the flow path to generate electrical current; and
- a variable resistance element coupled to the transducer and including a sensor responsive to changes in force applied by the surges to reduce resistance to movement by the transducer with relatively lower force.

12. A device as defined in claim 11, wherein the variable resistance element comprises a control device for adjusting displacement force from an optimal value required to operate the transducer to a lower resistance upon a reduction of force from the water surge.

13. A device as defined in claim 11, wherein the electro-mechanical transducer includes an anemometer configuration of rotational elements for providing rotational energy in response to the water movement.

14. A device as defined in claim 11, wherein the electro-mechanical transducer includes a drag body attached to a rotatable platform for providing rotational energy to the platform in response to the water movement.

15. An energy transducer device for positioning at the ocean floor for converting water movement along a shoreline in the ocean to electrical current, the device comprising:
- a mounting base configured for positioning at the ocean floor at a location of possible water movement along a flow path in a substantial horizontal orientation near the ocean floor;
- an electro-mechanical transducer coupled within a tube enclosure attached to the mounting base [to the mounting base] and configured for positioning within the flow path and responsive to the water movement along the flow path to generate electrical current; and
- a microcomputer coupled to the transducer and configured with a sensor to (i) monitor reciprocal surge activity developed by overhead wave action in vicinity of the transducer and (ii) adjust operating parameters of the transducer in response to the surge activity.

16. A device as defined in claim 15, wherein the electro-mechanical transducer includes an anemometer configuration of rotational elements for providing rotational energy in response to the water movement.

17. A device as defined in claim 16, wherein the electro-mechanical transducer includes a drag body attached to a rotatable platform for providing rotational energy to the platform in response to the water movement.

* * * * *